US012757051B2

(12) United States Patent
Barbu et al.

(10) Patent No.: US 12,757,051 B2
(45) Date of Patent: Oct. 6, 2026

(54) FRAMEWORK FOR AGNOSTICIZING POSITIONING MEASUREMENT REPORTS

(71) Applicant: Nokia Technologies Oy, Espoo (FI)

(72) Inventors: Oana-Elena Barbu, Aalborg (DK); Sajad Rezaie, Aalborg (DK); Athul Prasad, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 360 days.

(21) Appl. No.: 18/501,802

(22) Filed: Nov. 3, 2023

(65) Prior Publication Data

US 2024/0155403 A1 May 9, 2024

(30) Foreign Application Priority Data

Nov. 4, 2022 (GB) ..................................... 2216406

(51) Int. Cl.
*H04W 24/10* (2009.01)
*H04L 5/00* (2006.01)
*H04W 64/00* (2009.01)

(52) U.S. Cl.
CPC ........... *H04W 24/10* (2013.01); *H04L 5/0048* (2013.01); *H04W 64/00* (2013.01)

(58) Field of Classification Search
CPC ..... H04W 24/10; H04W 64/00; H04W 28/06; H04L 5/0048; H04L 5/005; H03M 7/3082; G01S 5/0036; G01S 5/0278; G06N 3/0455
See application file for complete search history.

(56) References Cited

U.S. PATENT DOCUMENTS 6,430,600 B1 * 8/2002 Yokote .................... G06F 9/465 719/332
2021/0195462 A1 6/2021 Pezeshki et al.
2021/0266787 A1 8/2021 Yoo et al.
2022/0046385 A1 2/2022 Sundararajan et al.
(Continued)

FOREIGN PATENT DOCUMENTS

WO 2021/177870 A1 9/2021
WO WO-2022/227081 A1 * 11/2022 ............. H04B 7/063
WO WO-2023/064419 A1 * 4/2023 ............ H04W 72/04

OTHER PUBLICATIONS

"3rd Generation Partnership Project; Technical Specification Group Radio Access Network; LTE Positioning Protocol (LPP) (Release 17)", 3GPP TS 37.355, V17.2.0, Sep. 2022, pp. 1-347.
(Continued)

*Primary Examiner* — Rafael Pérez-Gutiérrez
*Assistant Examiner* — Alexander Wu
(74) *Attorney, Agent, or Firm* — Lippes Mathias LLP

(57) ABSTRACT

Systems, methods, apparatuses, and computer program products for a framework for handling the appropriately configured positioning measurement reports for use by a network element without requiring knowledge of vendor-specific or proprietary information are provided. For example, a method may include receiving from a network node, a message including a code configuration to configure collected samples measurements for reporting. The method may also include generating a code from the collected samples measurements in a predefined format according to the code configuration. The method may further include reporting the generated code to the network node.

17 Claims, 8 Drawing Sheets

(56) References Cited

U.S. PATENT DOCUMENTS

2023/0017734 A1 * 1/2023 Singh ...................... G06F 40/20

OTHER PUBLICATIONS

"3rd Generation Partnership Project; Technical Specification Group Radio Access Network; NR; Physical channels and modulation (Release 17)", 3GPP TS 38.211, V17.3.0, Sep. 2022, pp. 1-136.
"3rd Generation Partnership Project; Technical Specification Group Radio Access Network; NR; Physical layer procedures for data (Release 17)", 3GPP TS 38.214, V17.3.0, Sep. 2022, pp. 1-232.
"New SI: Study on Artificial Intelligence (AI)/Machine Learning (ML) for NR Air Interface", 3GPP TSG RAN Meeting #94e, RP-213599, Agenda: 8.6.1, Qualcomm, Dec. 6-17, 2021, 6 pages.
Lau et al., "On the Design of MIMO Block-Fading Channels With Feedback-Link Capacity Constraint", IEEE Transactions on Communications, vol. 52, No. 01, Jan. 2004, pp. 62-70.
Kuo et al., "Compressive sensing based channel feedback protocols for spatially-correlated massive antenna arrays", IEEE Wireless Communications and Networking Conference (WCNC), Apr. 1-4, 2012, pp. 492-497.
Wen et al., "Deep learning for massive MIMO CSI feedback", IEEE Wireless Communications Letters, vol. 07, No. 05, Oct. 2018, pp. 748-751.
Guo et al., "Convolutional Neural Network based Multiple-Rate Compressive Sensing for Massive MIMO CSI Feedback: Design, Simulation, and Analysis", IEEE Transactions on Wireless Communications, vol. 19, No. 04, Apr. 2020, pp. 2827-2840.
Fan et al., "Fully Convolutional Neural Network-Based CSI Limited Feedback for FDD Massive MIMO Systems", IEEE Transactions on Cognitive Communications and Networking, vol. 08, No. 02, Jun. 2022, pp. 672-682.
"Msc-generator", Sourceforge, Retrieved on Mar. 6, 2024, Webpage available at :https://sourceforge.net/projects/msc-generator/.
Search Report received for corresponding United Kingdom Patent Application No. 2216406.5, dated May 19, 2023, 3 pages.
Extended European Search Report received for corresponding European Patent Application No. 23203422.3, dated Apr. 10, 2024, 11 pages.
"Other aspects on ML for positioning accuracy enhancement", 3GPP TSG RAN WG1 #114 Meeting, R1-2307243, Agenda: 9.2.4.2, Nokia, Aug. 21-25, 2023, 52 pages.

* cited by examiner

FRAMEWORK FOR AGNOSTICIZING POSITIONING MEASUREMENT REPORTS

FIELD

Some example embodiments may generally relate to communications including mobile or wireless telecommunication systems, such as Long Term Evolution (LTE) or fifth generation (5G) radio access technology or new radio (NR) access technology, or other communications systems including subsequent generations of the same or similar standards. For example, certain example embodiments may generally relate to a framework for handling the appropriately configured positioning measurement reports for use by a network element without requiring knowledge of vendor-specific or proprietary information.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network may also build on the E-UTRA radio. From release 18 (Rel-18) onward, 5G is referred to as 5G advanced. It is estimated that NR provides bitrates on the order of 10-20 Gbit/s or higher, and may support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which may provide both NR and LTE (and LTE-Advanced) radio accesses. It is noted that, in 5G, the nodes that may provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio. 6G is currently under development and may replace 5G and 5G advanced.

SUMMARY

An embodiment may be directed to an apparatus. The apparatus may include at least one processor and at least memory storing instructions. The instructions, when executed by the at least one processor, may cause the apparatus at least to receive from a network node, a message including a code configuration to configure collected samples measurements for reporting. The instructions, when executed by the at least one processor, may also cause the apparatus at least to generate a code from the collected samples measurements in a predefined format according to the code configuration. The instructions, when executed by the at least one processor, may further cause the apparatus at least to report the generated code to the network node.

An embodiment may be directed to an apparatus. The apparatus may include at least one processor and at least memory storing instructions. The instructions, when executed by the at least one processor, may also cause the apparatus at least to send to a second apparatus in a radio network, a message including a code configuration. The code configuration may configure the second apparatus to report collected samples measurements. The instructions, when executed by the at least one processor, may also cause the apparatus at least to receive from the second apparatus, a code generated in a predefined format from the collected samples measurements in a predefined format, according to the code configuration.

An embodiment may be directed to a method. The method may include receiving from a network node, a message including a code configuration to configure collected samples measurements for reporting. The method may also include generating a code from the collected samples measurements in a predefined format according to the code configuration. The method may further include reporting the generated code to the network node.

An embodiment may be directed to a method. The method may include sending to a user equipment or a base station in a radio network, a message including a code configuration. The code configuration may configure the second apparatus to report collected samples measurements. The method may also include receiving from the user equipment or the base station, a code generated in a predefined format from the collected samples measurements in a predefined format, according to the code configuration An embodiment may be directed to an apparatus. The apparatus may include means for receiving from a network node, a message including a code configuration to configure collected samples measurements for reporting. The apparatus may also include means for generating a code from the collected samples measurements in a predefined format according to the code configuration. The apparatus may further include means for reporting the generated code to the network node.

An embodiment may be directed to an apparatus. The apparatus may include means for sending to a second apparatus in a radio network, a message including a code configuration. The code configuration may configure the second apparatus to report collected samples measurements. The apparatus may also include means for receiving from the second apparatus, a code generated in a predefined format from the collected samples measurements in a predefined format, according to the code configuration.

BRIEF DESCRIPTION OF THE DRAWINGS

For proper understanding of example embodiments, reference should be made to the accompanying drawings, wherein.

DETAILED DESCRIPTION

Figure 1:
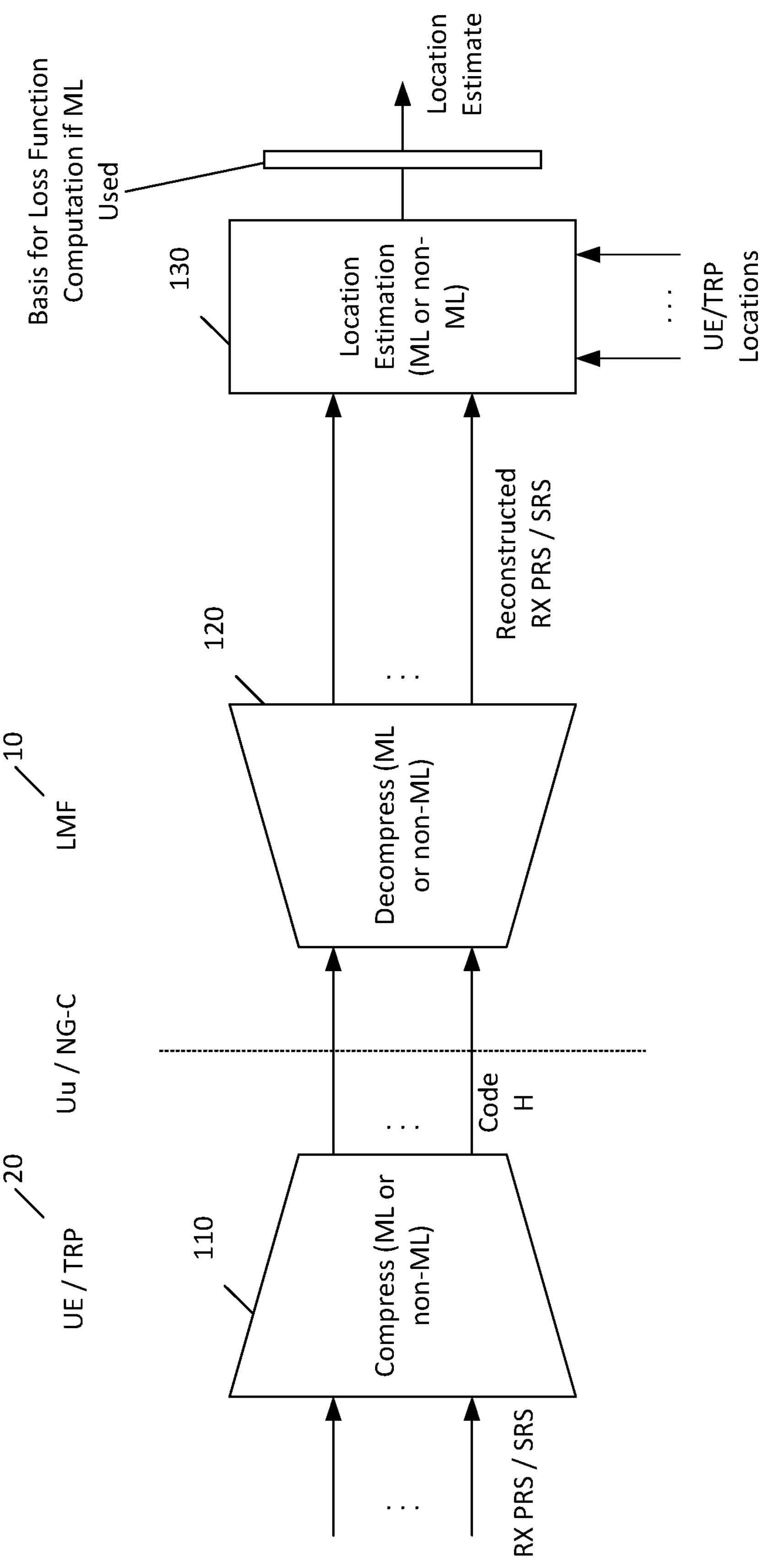
FIG. 1 illustrates a structure for location estimation, according to certain embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing a framework for handling the appropriately configured positioning measurement reports for use by a network element without requiring knowledge of vendor-specific or proprietary information, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Artificial intelligence (AI) and machine learning (ML) may used for a new radio (NR) air interface. For example, AI/ML may be used for positioning accuracy enhancement. Certain embodiments relate to a framework for permitting positioning measurement reports to be used without requiring transparency between the user equipment (UE) and the network, such as the location management function (LMF).

More particularly, certain embodiments may relate to providing an appropriate level of collaboration between UE and radio access network (RAN) node, such as next generation node B (gNB). Furthermore, certain embodiments may address issues relating to model training, model deployment, model inference, model monitoring, and model updating.

While certain embodiments relate to AI/ML, certain embodiments may also be relevant to implementations that operate without AI/ML or with a greater or lesser degree of AI/ML. Certain embodiments relate to specific use cases, but the principles described may also be applied to other use cases.

Localization study may be performed. In localization study, a set of data collection devices may be deployed in carefully chosen locations. An example of such data collection devices are positioning reference units (PRUs). PRUs may be reference devices at synchronized locations may be used as labels for training data related to solving an machine learning positioning task. PRUs may take measurements that are used to generate correction data that are used to refine the location of other target UEs in the area, thereby increasing their positioning accuracy. Data collection devices may be referred to as PRUs for simplicity, yet the same observations and comments may apply to any type of data collection device.

PRUs may conduct field positioning measurements and may report the measurements to a central unit. The PRUs may measure NR-signals, such as downlink (DL) positioning reference signal (PRS), uplink (UL) sounding reference signal (SRS), and the like. The PRUs may pre-process the signals before reporting to the central unit or feeding to a localization algorithm/block. The central unit may use tools to simulate/emulate positioning measurements.

An ML framework may be deployed at network entities running ML processes and/or algorithms. Such entities may be referred to as host types. Host types carrying out ML processes may be the target UE, the PRUs and potentially the radio access network to enhance the positioning accuracy. The radio access network elements may include the gNB and/or a location management component (LMC) or the like.

Data collection may benefit from being able to take into account vendor-specific details. However, without certain embodiments, such vendor-specific details may not be taken into account.

For model configuration and monitoring, the UE may provide details related to the model capability, validity conditions and requirements to the network related to the applied model, for UE-side model inference. The network may collect additional assistance signaling and measurements from the UE for network-side model deployment and inference.

For model input used in evaluations of AI/ML based positioning, when time-domain channel impulse response (CIR) or power delay profile (PDP) is used as model input in the evaluation, the input dimension $N_{TRP}*N_{port}*N_t$ may be reported. $N_{TRP}$ may be the number of TRPs, $N_{port}$ may be the number of transmit/receive antenna port pairs, and $N_t$ may be the number of time domain samples. However, this approach may not account for realistic UE- and network-vendor specific implementation issues related to the model inputs, which might degrade the model inference performance in real-world deployments.

To enable ML-based localization, measurements of the PRS/SRS may need to be transferred from the UE/TRP to the LMF so that the latter may compute the UE location. Such measurements may be indicative of the channel conditions between the UE and the TRP. How the measurements are used in the location computation may be an implementation aspect. However, depending on the underlying localization method, the LMF may require measurements of one or more of the following: delay profile, power delay profile (PDP), channel impulse response (CIR), received signal phase, reference signal received power (RSRP), reference signal received path power (RSRPP), received signal strength indicator (RSSI), line of sight (LOS) indicator, or any combination of thereof. Each of the above measurements require different RX processing capabilities and depends on the number of RX antennas; to make the matters worse, their quality is bounded not only by the complexity of the available RX algorithms but also by the limited bandwidth of the P/SRS. Furthermore, definitions of most of the above metrics is a challenging task, therefore it is unclear how to ensure that a measurement may be truly representative of the channel conditions. For example, if the UE is requested to report an estimated CIR of length X, there are no means by which the NW may ensure that each of the X entries in the CIR vector is capturing a signal reflection, and is not instead part of a cluster of correlated spurious taps that appear as a result of radio frequency (RF) nonlinearities. Likewise, there are no means by which the NW may ensure that the X reported entries are the only relevant ones, because the UE may observe Y paths, where Y>X.

Without an agreement on the type and size of the PRS/SRS (P/SRS) measurements that should be reported, a common ML-based positioning framework may be challenging to standardize. Ultimately, each vendor may develop ML-based positioning solutions using the best measurements for the vendor, and no agreements may be reached on what is the best measurement set for all vendors. Particularly, if the vendor-specific aspects contribute to the result, there may not be a convergent solution for all vendors.

Accordingly, certain embodiments avoid such an issue. For example, certain embodiments provide a reporting framework that is both UE-vendor and NW-vendor agnostic, giving thus the vendors full flexibility to develop proprietary ML-based positioning solutions. In this way, the various vendors do not need to agree on measurements and do not need to expose their proprietary vendor-specific aspects.

Although an autoencoder may be used in a CSI-feedback compression use case, in such a case the auto-encoder structure may be used for compression of CSI. By contrast, certain embodiments may use an auto-encoder for compressing processed P/SRS signal rather than CSI. The processed P/SRS signal may include the superimposition of multiple channel responses for multiple independent links, whereas the CSI signal may contain a single channel response. The transmitted P/SRS signal may also have different autocorrelation properties than CSI.

In certain embodiments, the auto-encoder may be part of whole training blocks and be trained/fine-tuned jointly with loss function over true and predicted positions.

In certain embodiments, both the encoder and decoder are ML-based compressor and de-compressor. However, in certain embodiments there may be a non-ML-based encoder followed by an ML-based decoder. In addition, non-ML-aided compression and decompression blocks may be used in certain embodiments.

Certain embodiments relate to a signalling framework that enables the NW to request and obtain new measurements for training, inference or both, from each UE/TRP. The measurements may be requested and obtained in a selected fixed format, as to size and type. The report may be vendor-agnostic and thus may avoid depending on any or all of the following: number of receive (RX) antennas; P/SRS bandwidth (BW) and duration; the specific localization algorithm used in each session; the number of TRPs, including number of antennas and ports, used for each UE's positioning session; number of field reflections; sampling period; where the model has been trained and where it resides; and where training data is collected.

By avoiding the measurement report's dependency of the above transceiver and channel limitations, the framework of certain embodiments may enable each vendor to develop the vendor's own ML-based positioning solutions, without exposing any elements used in the vendor's model design.

FIG. 1 illustrates a structure for location estimation, according to certain embodiments. Certain embodiments include signaling that enables the implementation of the underlying structure shown in FIG. 1. The UE having having one or more transmission/reception point (TRP) may collect samples of PRS/SRS. This collection and the subsequent operations by the UE/TRP may be performed based on instructions from, for example, the network. The UE/TRP may collect P/SRS samples at all receive antennas, for a given observation window.

The UE/TRP may compress the samples collected, and may produce a code H to be transferred to a NW element that performs the localization or training of an ML-based localization module. The network element be a location management function (LMF) for the UE. The code H may be transferred across the Uu interface to a gNB or other RAN element and may subsequently transferred by the NG-C interface to the LMF or the like. The size, shape, and entry type of code H may be decided by the LMF and may be signaled accordingly to the UE/TRP.

Optionally, the UE/TRP may label each code H with a label to be used for training a given ML positioning task, such as for ML localization. The label may be the UE location, for example the UE or TRP location expressed in 2D or 3D global positioning system (GPS) coordinates.

The LMF may decompress the code H and form reconstructed PRS/SRS signals. Location estimation may be done, which may take into account known UE/TRP locations. If ML is used the distance between the estimate and the actual UE/TRP locations may serve as the basis for loss function computation during training/learning.

Generating code H is equivalent to compressing and quantizing several thousands of observed RX signal samples into a matrix H of much smaller dimensions, for example matrix H may have a few hundreds of entries instead of thousands. Similarly, using the reported code H by the LMF to ultimately produce the UE location estimate may be seen as equivalent to decompressing and dequantizing the code H into a reconstructed version of the P/SRS, followed by locating the UE using the reconstructed samples, and the known location of all TRPs involved in the current positioning session.

Figure 2:
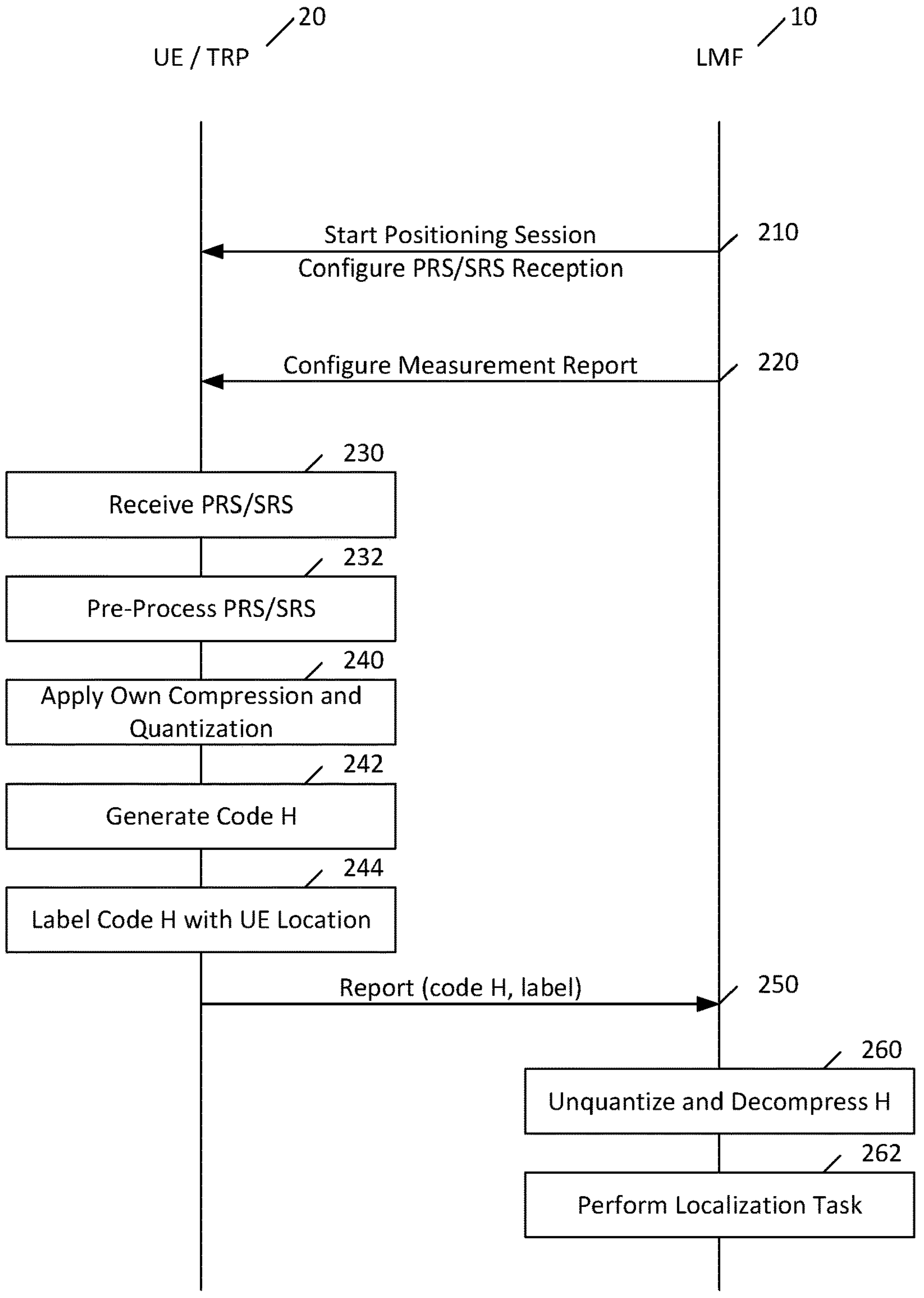
FIG. 2 illustrates a signaling flow and processing diagram of a method, according to certain embodiments.

FIG. 2 illustrates a signaling flow and processing diagram of a method, according to certain embodiments. As shown in FIG. 2, a positioning session may begin at 210. The LMF may configure the UE/TRP for reception of PRS and/or SRS. Additionally, at 220, the LMF may configure the UE/TRP to generate and report a code H that is agnostic to various considerations including, but not necessarily limited to number of RX antennas; P/SRS BW and duration; the specific localization algorithm used in each session; the number of TRPs, including number of antennas and ports, used for each UE's positioning session; number of field reflections; sampling period; where the model has been trained and where it resides; and where training data is collected.

The LMF, after configuring the session and the P/SRS transmission and reception at 210, at 220 may signal to the UE/TRP the configuration of code H. The configuration may indicate the code size and shape: M×N, where M is the number of rows of H and N is the number of columns. This may be configured explicitly via setting M and N or implicitly via setting a code size C=MN.

The configuration may also indicate whether the code H should be generated for each TRP, by setting type_flag=1, or if one single code H should be extracted for all TRPs, by setting type_flag=0. The I/O convention may be reversed. Other ways of indicating are also permitted.

The configuration may further indicate the type of quantization, for example scalar or vector, that is to be applied by setting the variable quantizer to the corresponding value.

The configuration may additionally indicate a compression type via setting the variable compression to one of two values: ML or non-ML. Other compression types are also permitted.

The configuration may also include a label L, if—for example—the code H is collected for the purpose of training an ML model for solving a localization task. For example, if the task is location estimation, then L may be the 2D/3D UE location. If the task is LOS detection, then L may be a vector of probabilities, where the i-th entry indicates the probability that the link UE-TRP(i) is in LOS. There is further discussion of such an approach with reference to FIG. 7.

At 230, the UE/TRP may receive the PRS/SRS and, at 232, the UE/TRP may pre-process the PRS/SRS, for example by isolating the signal per TRP, if the UE/TRP has been so configured.

Using the pre-processed PRS/SRS, at 240, the UE/TRP may apply the UE/TRP's own compression and quantization, which may be utilizing ML and/or non-ML approaches. At 242, the UE/TRP may generate the code H according to the configuration obtained at 220. At 244, if so configured, the UE/TRP may label the code H with, for example, UE location or other labelling.

The reporting of the code H, and optionally also the label, may occur at 250. At 260, the LMF may unquantize and decompress H. The outcome of 260 may be used to perform a localization task at 262.

Even though the configuration at 220 in FIG. 2 is illustrated as an independent signal, the configuration may be implemented as a set of new information elements (IEs) to be sent over existing LPP or NRPPa assistance data messages.

For example, if the positioning receiver is the UE, then configurations carried at 220 may be realized as new fields in LTE positioning protocol (LPP) message, "ProvideAssistanceData", which was defined in 3GPP TS 37.355 section 4.1.4 LPP Messages. For example, as shown in Table 1 below, a new field, "Code size C of M×N" may have the role of identifying the size of code H to be reported. As another example, a new field, "Type_flag," may indicate whether one code H per TRP is to be reported (type_flag=1) or a single code H for all TRPs is to be reported (type_flag=0). As a further example, a new field, "Quantizer," may indicate whether the type of quantization is scalar or vector. As yet another example, a new field, "Compression," may indicate whether the type of compression is ML or non-ML. As a final example, a new field, "Label," may indicate a type of label, for example 2D/3D location or LOS probability vector.

TABLE 1

| New field | Role |
|---|---|
| Code size C or M × N | Identify the size of code H to be reported |
| Type_flag | Indicate whether one code H per TRP should be reported (type_flag = 1) or if a single code H for all TRP should be reported (type_flag = 0) |
| Quantizer | Indicates the type of quantization: scalar/vector |
| Compression | Indicates the type of compression: ML or non-ML |
| Label | Indicates the type of label: 2D/3D location or LOS probability vector |

Similar fields may be defined for NR positioning protocol A (NRPPa) IEs configuring the TRP instead of UE for UL positioning.

There may be a variety of alternative implementations. In the embodiment illustrated in FIG. 1, each of the compression block 110, the decompression block 120, and the location estimation block 130 may be implemented using non-ML compression and non-ML position estimators, respectively. The illustrated blocks, 110, 120, and 130 may each be implemented in hardware, such as by software running on central processing unit (CPU), or as an application specific integrated circuit (ASIC). Other implementations are also permitted. In an example, the block 130 may be a remote cloud computing engine.

Figure 3:
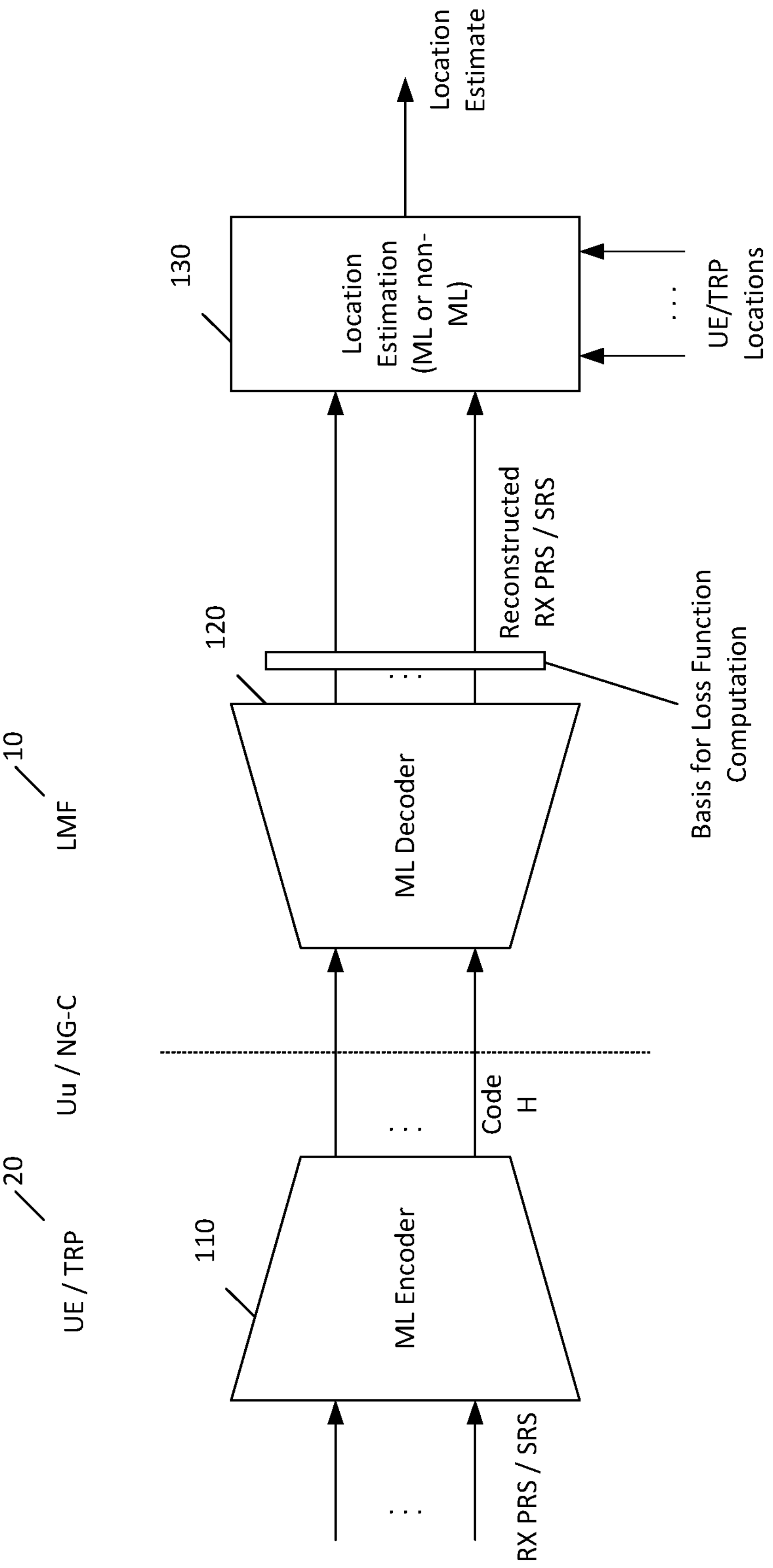
FIG. 3 illustrates an alternative structure for location estimation, according to certain embodiments.

FIG. 3 illustrates an alternative structure for location estimation, according to certain embodiments. In this example, the compression and decompression blocks 110, 120 may be implemented as an auto-encoder (AE) and may be trained jointly/separately using the output of the decompressor directly as shown in FIG. 3. The training mode, whether jointly or separately, may be communicated and coordinated between the entities. In the joint training mode, the data collector entity may train an AE first and may then share the decoder model, for example structure and weight, with the other side. Two-sided joint training is possible by transferring the backward gradients from the decoder to encoder side. In addition, in the separate training, the data collector entity may train an AE first and may then share the P/SRS dataset with the corresponding codes, or encoder outputs, with the decoder. The location estimation block 130 may be implemented with a non-ML position estimator, if desired.

The UE may be configured for a DL positioning session with a measurement report that includes code H, encoding the PRS according to the instructions received by the LMF via an autoencoder configuration information element. For, example, the configuration may indicate the following: C=100; Type_flag=1 meaning one code for each TRP; quantizer=scalar; compression=ML; and label=N/A.

This configuration may be applied to the structure shown in FIG. 3. The UE may receive PRS signals from N=8 TRPs as configured by the LMF via LPP assistance data. The UE may observe a signal representable by the following:

$$y(t)=\sum_{n=1}^{N}(s_n*h_n)(t)+\epsilon(t), \tag{1}$$

where $s_n$ is the known PRS transmitted by the n-th TRP, $h_n$ is the channel response between the UE and the n-th TRP and E is additive white Gaussian noise (AWGN).

The UE may sample the RX signal at a sampling rate $f_s$ and may collect the resulting K samples in a vector x, where the i-th entry of the vector is $$x(i)=y(iT_s),\ T_s=\frac{1}{f_s}.$$

These samples x, K=4177, may be input to the ML encoder of FIG. 3. The encoder may produce a code H with length C=100 which may be forwarded to the LMF. The LMF may input the code H into the ML decoder and may reconstruct the samples $\hat{x}$, at a reconstruction error of mean square error MSE(x, $\hat{x}$)=−24.5743 dB. These results may then be sent to the location estimation block 130 to yield the final UE location estimate.

Figure 4:
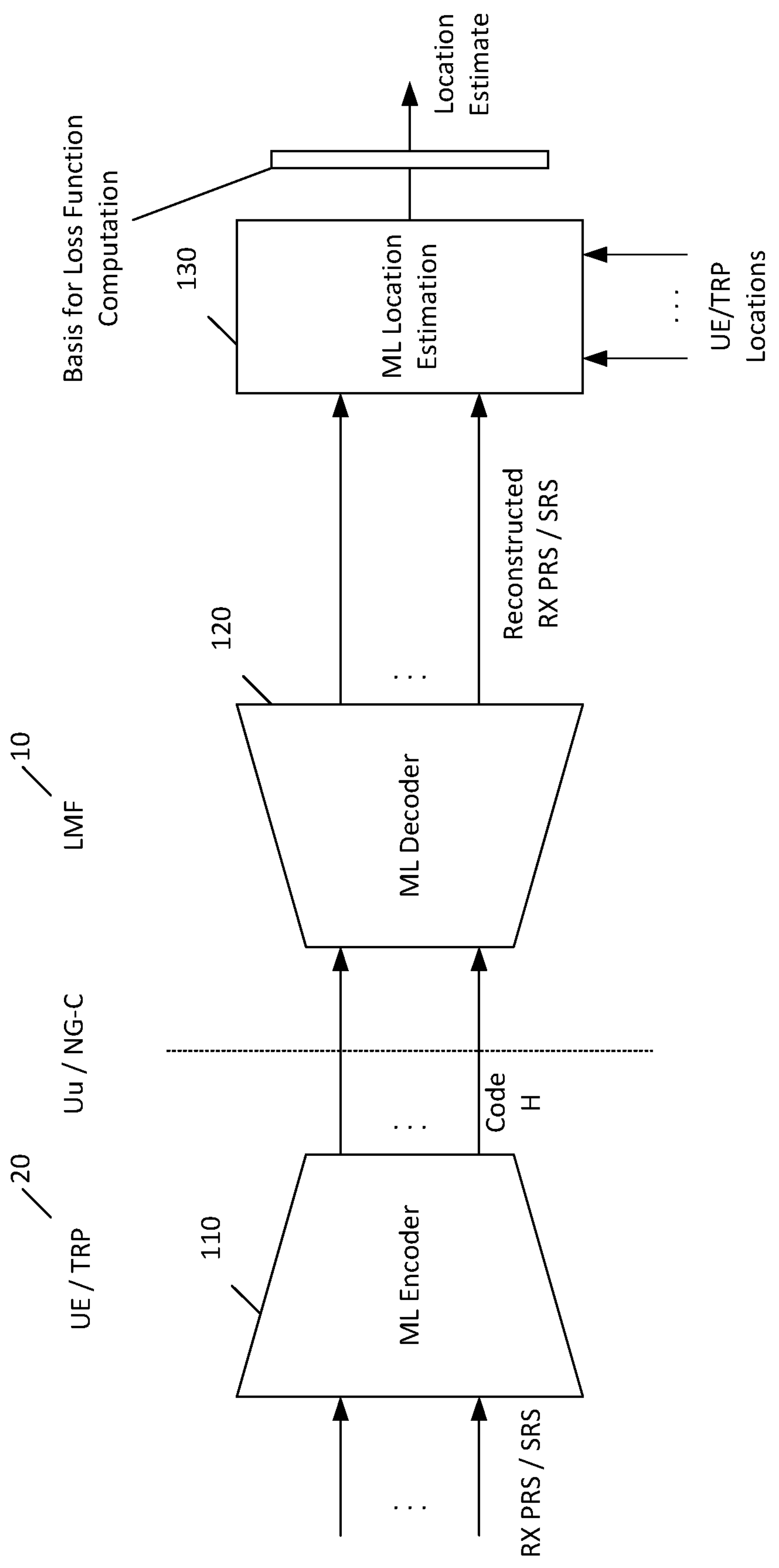
FIG. 4 illustrates a further alternative structure for location estimation, according to certain embodiments.

FIG. 4 illustrates a further alternative structure for location estimation, according to certain embodiments. In this example, the compression and decompression blocks 110, 120 may be implemented using an autoencoder. Likewise, location estimation may be ML-based. All blocks 110, 120, and 130 may be trained jointly using the output of the location estimation block 130 directly, as shown in FIG. 4. The loss function may be Euclidian distance between the estimated and true location.

Figure 5:
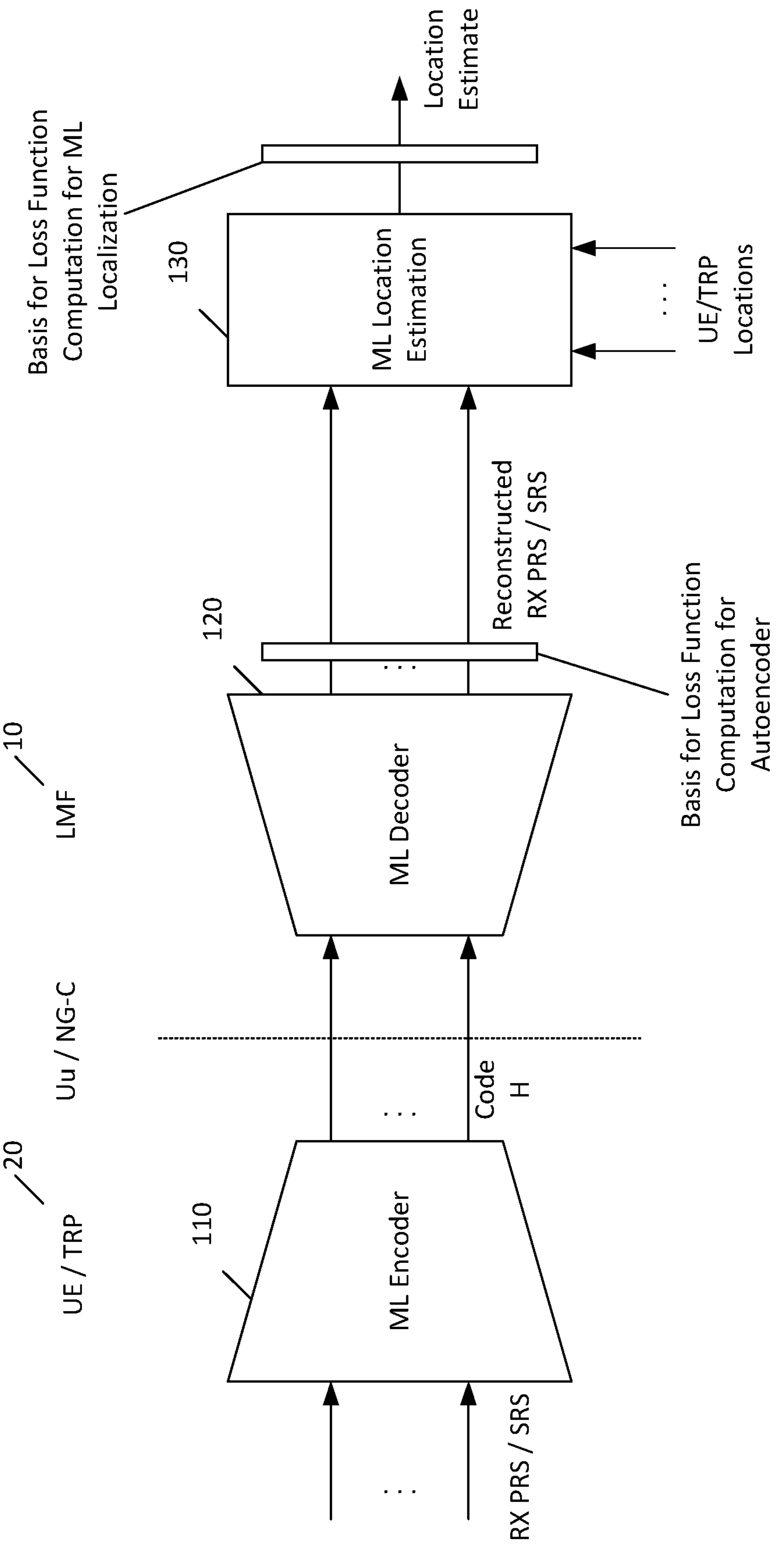
FIG. 5 illustrates an additional alternative structure for location estimation, according to certain embodiments.

FIG. 5 illustrates an additional alternative structure for location estimation, according to certain embodiments. In this example, the compression and decompression blocks 110, 120 may be implemented using an autoencoder. Likewise, location estimation may be ML-based. The compression and decompression blocks 110, 120 may be trained jointly using the output of the decompression block 120, using a first loss function. On the other hand, ML-based location estimator 130 may be trained separately from the former two blocks 110, 120, using a second loss function, as shown in FIG. 5. The first loss function may be the mean square error (MSE) between the true and reconstructed P/SRS. The second loss function may be same Euclidian error function as in the embodiment illustrated in FIG. 4.

Figure 6:
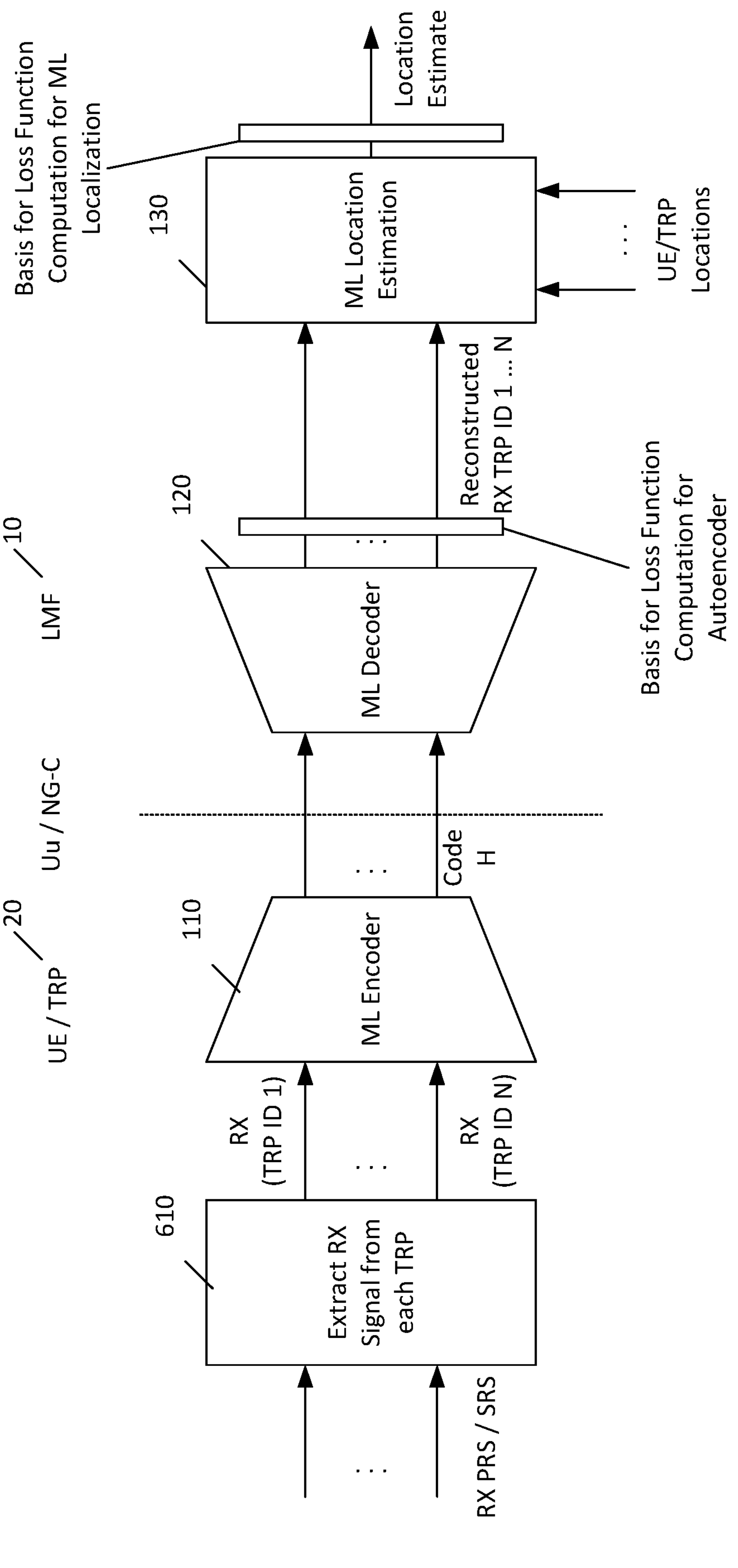
FIG. 6 illustrates yet another alternative structure for location estimation, according to certain embodiments.

FIG. 6 illustrates yet another alternative structure for location estimation, according to certain embodiments. The structure of FIG. 6 may resemble the structure of FIG. 5, except that the input to the compressor black may be a a pre-processed version of the RX P/SRS in which each RX signal per TRP is isolated by extraction block 610 from the total RX signal. Thus, as well, the output of the decoder may be similarly isolated. The extraction block 610 may be implemented in hardware. For example, the extraction block 610 may be implemented by software running on hardware or by an ASIC. Other implementations are also permitted.

Figure 7:
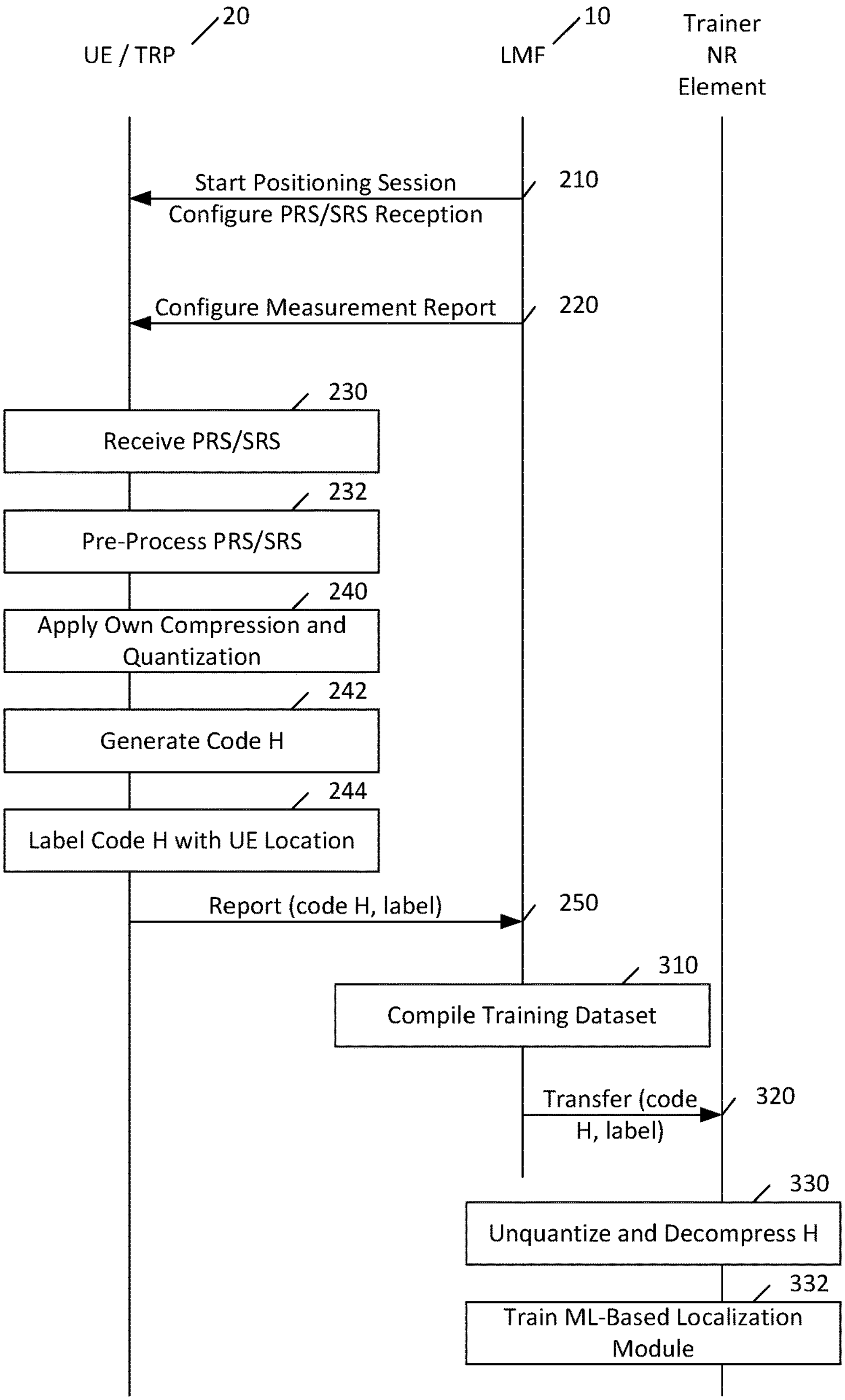
FIG. 7 illustrates an alternative signaling flow and processing diagram of a method, according to certain embodiments.

FIG. 7 illustrates an alternative signaling flow and processing diagram of a method, according to certain embodiments. In this embodiment, procedures from 210 to 250 may be the same as in FIG. 2. Thus, code H may be obtained at the LMF at procedure 250. At 310, the LMF may compile a training data set from multiple sources as pairs of code H and a corresponding label. At 320, the LMF may communicate the training data to another NR element in charge of training/re-training the ML-based localization method. This network element may be referred to as a trainer. If the trainer is a UE, then at 320 the code H may be transferred over LPP AssistanceData, together with the label for the code. If the trainer is a TRP, the transfer of the pair (H, label) may happen at 320 over NRPPa.

The trainer may unquantize and decompress H at 330. Moreover, the trainer may, at 332, train an ML-based localization module using the data from the LMF.

Figure 8:
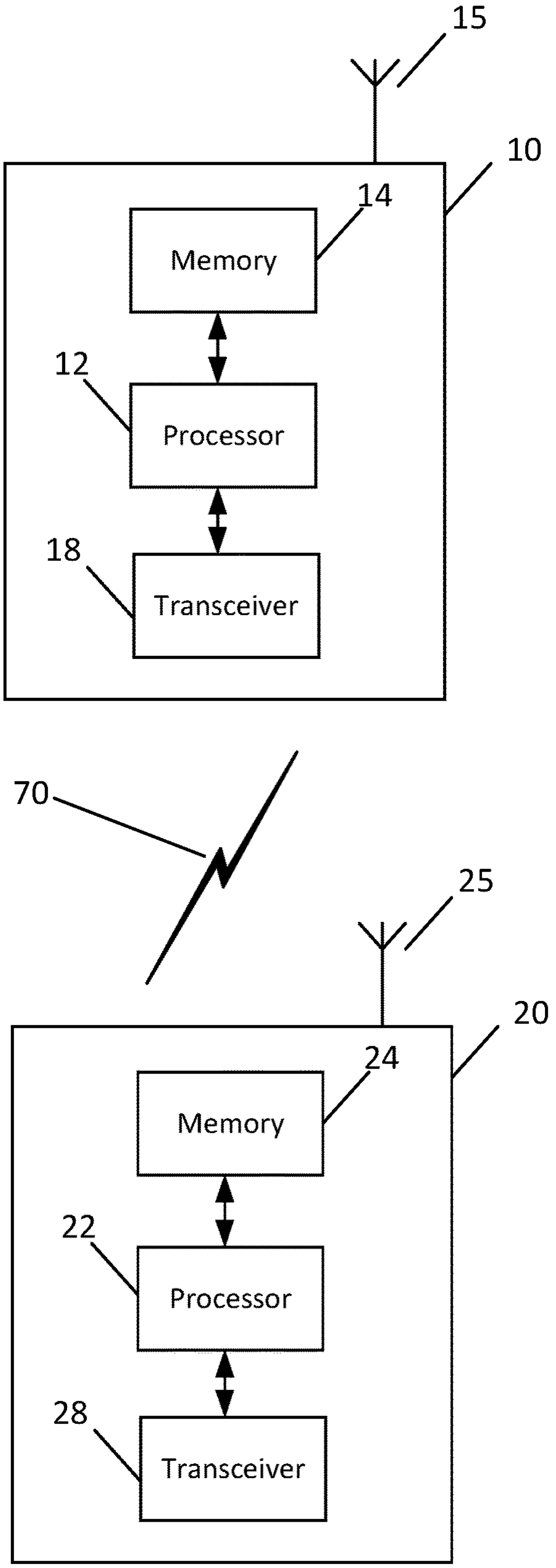
FIG. 8 illustrates an example block diagram of a system, according to an embodiment.

FIG. 8 illustrates an example of a system that includes an apparatus 10, according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may include an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a mid-haul interface, referred to as an F1 interface, and the DU(s) may have one or more radio unit (RU) connected with the DU(s) over a front-haul interface. The DU may be a logical node that includes a subset of the gNB functions, depending on the functional split option. It should be noted that one of ordinary skill in the art would understand that apparatus 10 may include components or features not shown in FIG. 8.

As illustrated in the example of FIG. 8, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 8, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to a framework for handling the appropriately configured positioning measurement reports for use by a network element without requiring knowledge of vendor-specific or proprietary information.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 may be include any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna (s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 1-7, or any other method described herein. In some embodiments, as discussed herein, apparatus 10 may be configured to perform a procedure relating to providing a framework for handling the appropriately configured positioning measurement reports for use by a network element without requiring knowledge of vendor-specific or proprietary information, for example.

FIG. 8 further illustrates an example of an apparatus 20, according to an embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 8.

As illustrated in the example of FIG. 8, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 8, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 may include any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDM symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 1-7, or any other method described herein. For example, in an embodiment, apparatus 20 may be controlled to perform a process relating to providing a framework for handling the appropriately configured positioning measurement reports for use by a network element without requiring knowledge of vendor-specific or proprietary information, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

According to certain embodiments an apparatus (20) may include at least one processor (22) and at least one memory (24) storing instructions that, when executed by the at least one processor (22), cause the apparatus (20) at least to receive (220) from a network node (10), a message comprising a code configuration (220) to configure collected samples measurements (230 to 242) for reporting (250). The apparatus (20) may also generate (242) a code from the collected samples measurements in a predefined format according to the code configuration. The apparatus (20) may further report (250) the generated code to the network node (10).

In certain embodiments, the generated code (242) from the collected samples measurements may be obtained by compressing (240) representations of the collected samples (230 to 232) into the predetermined format defined by the code configurations (220).

In certain embodiments, the collected samples may be collected via a plurality of receiving antennas (25) of the apparatus (20).

In certain embodiments, the collected samples may include reference signals (230) that are used to estimate a location of the apparatus (20).

In certain embodiments, the reference signals (230) may include positioning reference signals or sounding reference signals (PRS/SRS).

In certain embodiments, the code configuration (220) may be information elements (IE) (see Table 1) within the message (e.g., LPP Message) defining the predetermined format of the generated code, including: a size, shape, and entry type.

In certain embodiments, the size and shape of the generated code may be defined by a matrix having M rows and N columns.

In certain embodiments, the entry type of the generated code may be defined at least by one or more of: a flag type for reporting, a quantizer type, a compression type and a label type.

In certain embodiments, the label type may be associated with the generated code (e.g., code H) to train a block of the generated code to reconstruct initially collected samples reconstruction when reporting a two dimensional or three dimensional location, or a line of sight (LOS) probability vector of the apparatus.

In certain embodiments, the quantizer type may cause the apparatus (20) to perform a scalar or vector quantization on the collected samples to obtain the generated code.

In certain embodiments, the vector quantization may include selected finite vector points or codewords that are shared when performing compression (240) of the collected samples.

In certain embodiments, the compression type may cause the apparatus (20) to perform a machine learning (ML) or non-machine learning (non-ML) on the collected samples to obtain the generated code (110).

In certain embodiments, the apparatus (20) may include one of: a user terminal device, a transmit/receive point or a base station, and the network node (10) may include a location management function (LMF).

In certain embodiments, the collected sample measurements may be isolated (610) by transmit/receive point prior to generating the code (110).

According to certain embodiments, an apparatus (10) may include at least one processor (12) and at least one memory (14) storing instructions that, when executed by the at least one processor (12), cause the apparatus (10) at least to send (220) to a second apparatus (20) in a radio network, a message (e.g., LPP message) that includes a code configuration (220). The code configuration may configure the second apparatus (20) to report collected samples measurements. The apparatus (10) may also receive (250) from the second apparatus (20), a code (code H) generated in a predefined format from the collected samples measurements in a predefined format, according to the code configuration.

In certain embodiments, the generated code (242) from the measurements is obtained by compressing (110) representations of collected samples into the predetermined format defined by the code configurations.

In certain embodiments, the apparatus (10) is caused to de-quantize and decompress (120, 260) the generated code to re-construct the collected samples (230) that are representative of a network environment of the second apparatus.

In certain embodiments, the apparatus (10) is configured to decompress (120) the generated code using an auto-encoder.

In certain embodiments, the auto-encoder (110, 120) is trained using machine learning-based training based on a direct output of the auto-encoder (110, 120).

In certain embodiments, the apparatus (10) is further configured to estimate a location (262) of the second apparatus (20) based on an output of the autoencoder (120) using a trained location estimation circuit (130) to provide an output location estimate.

In certain embodiments, the auto-encoder (110, 120) is trained jointly with the location estimation circuit (130) based on the output location estimate.

In certain embodiments, the location estimation circuit (130) is trained separately from the autoencoder (110, 120) based on the output location estimate. In an example, the location estimation circuit (130) may be a remote cloud computing engine.

In certain embodiments, the apparatus (10) is caused to perform at least one of machine learning-based training (ML) or non-machine learning-based (non-ML) processing on the re-constructed collected samples to estimate a location (262) of the second apparatus (20).

In certain embodiments, the collected samples are collected via a plurality of receiving antennas (25) of the second apparatus (20).

In certain embodiments, the collected samples may include reference signals that are used to estimate a location of the apparatus (10) or the second apparatus (20).

In certain embodiments, the reference signals may include positioning reference signals or sounding reference signals (PRS/SRS).

In certain embodiments, the code configuration may be information elements (IE) within the message defining the predetermined format of the generated code, including a size, shape, and entry type.

In certain embodiments, the size and shape of the generated code may be defined by a matrix having M rows and N columns.

In certain embodiments, the entry type of the generated code may be defined at least by one or more of: a flag type for reporting, a quantizer or de-quantizer type, a compression or decompression type and a label type.

In certain embodiments, the label type may be associated with the generated code to compensate loss in collected samples reconstruction when reporting a two dimensional or three dimensional location, or a line of sight (LOS) probability vector of the second apparatus (20).

In certain embodiments, the quantizer or de-quantizer type may cause the apparatus to perform a scalar or vector de-quantization (260) on the generated code to obtain the collected samples.

In certain embodiments, the vector de-quantization (260) may include selected finite vector points or codewords that are shared when performing de-compression of the collected samples.

In certain embodiments, the de-compression type may cause the apparatus (10) to perform a machine learning (ML) or non-machine learning (non-ML) on the generated code based on the label type (332).

In certain embodiments, the apparatus (10) may be caused to compile (310) training data sets from multiple sources on the generated code based on the label type.

In certain embodiments, the apparatus (10) is caused to transfer (320) the training data sets on the generated code based on the label type to a remote trainer server to perform the de-quantization (330) or the machine learning training (332) to determine a location of the second apparatus (20).

In certain embodiments, the apparatus (10) may include a location management function (LMF), and the second apparatus (20) may include one of: a user terminal device, a transmit/receive point, or a base station.

According to certain embodiments, a method may include receiving (220) from a network node (10), a message including a code configuration to configure collected samples measurements for reporting. The method may also include generating (242) a code from the collected samples measurements in a predefined format according to the code configuration. The method may further include reporting (250) the generated code to the network node (10).

According to certain embodiments, a method may include sending (220) to a user equipment (20) or a base station in a radio network, a message including a code configuration. The code configuration may configure the user equipment (20) or the base station to report collected samples measurements. The method may also include receiving (250) from the user equipment (20) or the base station, a code generated in a predefined format from the collected samples measurements in a predefined format, according to the code configuration.

According to certain embodiments, an apparatus (20) may include means for receiving (25) from a network node (10), a message (220) that includes a code configuration to configure collected samples measurements for reporting. The apparatus (20) may also means for generating (110) a code (code H) from the collected samples measurements in a predefined format according to the code configuration. The apparatus may further include means for reporting (25, 250) the generated code to the network node (10).

According to certain embodiments, an apparatus (10) may include means for sending (15) to a second apparatus (20) in a radio network, a message (220) that includes a code configuration. The code configuration may configure the second apparatus (20) to report collected samples measurements. The apparatus (10) may also include means for receiving (15) from the second apparatus (20), a code (code H, 250) generated in a predefined format from the collected samples measurements in a predefined format, according to the code configuration.

In view of the foregoing, certain example embodiments provide several technological improvements, enhancements, and/or advantages over existing technological processes and constitute an improvement at least to the technological field of wireless network control and/or management. Certain embodiments may have various benefits and/or advantages. For example, certain embodiments provide and implement a framework for selection of a best positioning measurement report. For example, certain embodiments provide a reporting framework that is both UE-vendor and NW-vendor agnostic. Thus, vendors may have full flexibility to develop proprietary ML-based positioning solutions.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium. The term "non-transitory" as used herein, is a limitation of the medium itself (i.e. tangible, not a signal) as opposed to a limitation on data storage persistency (e.g. RAM vs. ROM).

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that may be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY

AWGN additive white Gaussian noise
LMF location management function

PRS positioning reference signal
PRU positioning reference unit
TRP transmit/receive point
GNSS global navigation satellite system
2D two dimensional
GNSS global navigation satellite system
RAT radio access technology
ML machine learning
LCS label consistency score
NLL noisy label loss
NLP noisy label processing
MSE mean squared error

We claim:

1. An apparatus, comprising:

at least one processor; and at least one memory storing instructions that, when executed by the at least one processor, cause the apparatus at least to perform:

receive from a network node, a message comprising a code configuration to configure collected samples measurements for reporting;

generate a code from the collected samples measurements in a predefined format according to the code configuration; and report the generated code to the network node wherein:

the code configuration are information elements (IE) within the message defining the predetermined format of the generated code, comprising: a size, shape, and entry type, the entry type of the generated code is defined at least by one or more of: a flag type for reporting, a quantizer type, a compression type and a label type, and the label type is associated with the generated code to train a block of the generated code to reconstruct initially collected samples when reporting a two dimensional or three dimensional location, or a line of sight (LOS) probability vector of the apparatus.

2. The apparatus of claim 1, wherein the generated code from the collected samples measurements is obtained by compressing representations of the collected samples into the predetermined format defined by the code configurations.

3. The apparatus of claim 1, wherein the collected samples are collected via a plurality of receiving antennas of the apparatus.

4. The apparatus according to claim 1, wherein the collected samples comprises reference signals that are used to estimate a location of the apparatus.

5. The apparatus according to claim 4, wherein the reference signals comprise positioning reference signals or sounding reference signals (PRS/SRS).

6. The apparatus of claim 1, wherein the size and shape of the generated code is defined by a matrix having M rows and N columns.

7. The apparatus of claim 1, wherein the quantizer type causes the apparatus to perform a scalar or vector quantization on the collected samples to obtain the generated code.

8. The apparatus of claim 7, wherein the vector quantization comprises selected finite vector points or codewords that are shared when performing compression of the collected samples.

9. The apparatus of claim 1, wherein the compression type causes the apparatus to perform a machine learning (ML) or non-machine learning (non-ML) on the collected samples to obtain the generated code.

10. The apparatus of claim 1, wherein the apparatus comprises one of: a user terminal device, a transmit/receive point or a base station, and the network node comprises a location management function (LMF).

11. The apparatus of claim 1, wherein the collected sample measurements are isolated by transmit/receive point prior to generating the code.

12. An apparatus, comprising:

at least one processor; and at least one memory storing instructions that, when executed by the at least one processor, cause the apparatus at least to perform:

send to a second apparatus in a radio network, a message comprising a code configuration, wherein the code configuration configures the second apparatus to report collected samples measurements; and receive from the second apparatus, a code generated in a predefined format from the collected samples measurements in a predefined format, according to the code configuration, wherein:

the code configuration are information elements (IE) within the message defining the predetermined format of the generated code, comprising: a size, shape, and entry type, the entry type of the generated code is defined at least by one or more of: a flag type for reporting, a quantizer type, a compression type and a label type, and the label type is associated with the generated code to train a block of the generated code to reconstruct initially collected samples when reporting a two dimensional or three dimensional location, or a line of sight (LOS) probability vector of the apparatus.

13. The apparatus of claim 12, wherein the generated code from the measurements is obtained by compressing representations of collected samples into the predetermined format defined by the code configurations.

14. The apparatus of claim 13, wherein the apparatus is caused to de-quantize and decompress the generated code to re-construct the collected samples that are representative of a network environment of the second apparatus.

15. The apparatus of claim 14, wherein the apparatus is configured to decompress the generated code using an auto-encoder.

16. The apparatus of claim 15, wherein the auto-encoder is trained using machine learning-based training based on a direct output of the auto-encoder.

17. The apparatus of claim 15, wherein the apparatus is further configured to estimate a location of the second apparatus based on an output of the autoencoder using a trained location estimation circuit to provide an output location estimate.

* * * * *